L. K. LEAHY.
SPARKING DEVICE FOR INTERNAL COMBUSTION ENGINES.
APPLICATION FILED AUG. 17, 1905.

950,001.

Patented Feb. 22, 1910.

Witnesses:

Inventor
Louis K. Leahy
By
Townsend, Lyon, Hackley & Knight
Attorneys

UNITED STATES PATENT OFFICE.

LOUIS K. LEAHY, OF LOS ANGELES, CALIFORNIA.

SPARKING DEVICE FOR INTERNAL-COMBUSTION ENGINES.

950,001. Specification of Letters Patent. Patented Feb. 22, 1910.

Application filed August 17, 1905. Serial No. 274,629.

*To all whom it may concern:*

Be it known that I, LOUIS K. LEAHY, a citizen of the United States, residing at Los Angeles, county of Los Angeles, State of California, have invented a new and useful Sparking Device for Internal - Combustion Engines, of which the following is a specification.

This invention relates to means for maintaining the sparking devices of internal combustion engines in operative condition, and it comprises means for detecting inoperativeness of such devices and for renewing or replacing an inoperative spark plug with an operative one without stopping the engine.

A serious difficulty in operation of internal combustion engines, wherein the ignition is effected by electric sparks, is the liability of failure of the spark gap means, such failure being due, for example, to deposition of oil or of products of combustion on the electrodes or to undue separation of the electrodes, owing to heat and vibration. My invention provides for detection of such condition in the spark plug and for replacing the defective spark plug with a new spark plug, the detection and substitution being effected while the engine is still running and without interference with the operation thereof. The invention is especially applicable in connection with multicylinder engines, the detector means indicating in what cylinder the break down of the spark plug has occurred and the substituting devices enabling the spark plug in such cylinder to be immediately replaced by an operative plug without stopping the engine, this act restoring the detection means to normal condition.

Spark gap systems have been used wherein an external spark gap is connected in series with the internal spark gap for indicating the passage of sparking current, and for other reasons, but in case of a break down in the battery, or open circuiting of the connections elsewhere, such a device would fail to show a spark under conditions when the internal spark gap might be in proper condition but the circuit is otherwise defective as by running down of the battery, short circuit of the battery, or open circuiting at some point other than the spark gap. This invention provides means whereby positive indication is given of the fact that there is a defect in the internal spark gap and that the circuit is otherwise in good condition.

The invention comprises in connection with an internal combustion engine, spark gap means in operative communication with a combustion chamber, and external spark gap means connected in shunt in the internal spark gap means, said shunt being of higher resistance or impedance than the operating spark gap, so that the spark will only pass through the external spark gap on failure of the internal spark gap.

The invention further comprises means for withdrawing a defective sparking device from the cylinder, and for replacing such defective device with one in good condition.

The invention also comprises means for testing the withdrawn sparking device.

The invention also comprises special operating means for the sparking devices as hereinafter set forth.

The accompanying drawings illustrate the invention, and referring thereto:—

The engine is shown as comprising four cylinders 1 mounted on the base 2 and provided with mixing or ignition chambers 3 connected to the cylinder by firing tubes, inlet valves 4 and exhaust connections 5, all arranged in the usual manner.

A sparking device as here shown, is applied to the mixing chamber, although it could be applied to any part in communication with the combustion or working chamber or cylinder of the engine.

The sparking device for each cylinder comprises a casing or cylinder 6, having a port, aperture or opening 7 at one side communicating with the mixing chamber 3 and a plug or carrier member 8 fitting in said cylinder 6 and movable or rotatable therein, and a plurality of sparking devices carried by said movable carrier member in such manner as to be brought alternatively opposite the said aperture into communication with the mixing chamber through the aforesaid opening by the movement of said member. For this purpose said plug or member 8 may have a plurality of recesses or pockets 8' and a plurality of sets of sparking electrodes 9, 9' secured therein, being, for example, supported by plugs 10 screwing into the end wall of said pockets. One electrode 9' of each set is assumed to be connected to the metal of the plug and thereby to the engine frame or ground. The other electrode 9 is insulated by a sleeve or bushing 11 of insulating material, and is connected to a head or contact 12 at the outer end of the plug so as to be exposed to receive the electrical connection. Said electrical connection is preferably made automatically on turning the rotatable carrier member to bring the corresponding set of electrodes into communication with the combustion chamber. For this purpose, a contact spring 13 may be supported on supports 14 and arranged to contact with the respective heads or terminals 12 in the rotation of the member 8; said spring is preferably in the form of a bow bridging between two supports 14, which are rotatably mounted on pins 14', at such distance apart that when the spring is inserted between said supports and the latter are slipped on said pins, the spring will be sprung or bowed out into the path of terminals 12.

The sparking electrode carrier member 8 is provided with means for moving the same to bring one or the other of the sets of sparking electrodes in operative position so as to constitute substituting or replacing means for the spark gap devices. In case of a multiple cylinder engine, the operating means for the several carrier members are preferably arranged so that they may be operated from the same point. For this purpose a shaft 17 extends axially through all of the aforesaid members and is provided at one end with a handle or manual operating means consisting of a hand wheel 18 and a sleeve 19 is mounted rotatably on the shaft 17 and extends axially through the carrier members for two of the cylinders, said sleeve being provided, adjacent to the hand wheel 18, with a hand wheel 20, shaft 17 passing loosely through the carrier members for the other two cylinders. A disk 21 is fastened on said shaft and is provided with pins 22, adapted to engage respectively and alternatively in sockets or openings 23 in disks 24 fastened on the aforesaid carrier members, so that by moving the shaft longitudinally in one direction, one of said pins will be caused to engage an opening in the disk of one of said members, thereby clutching the shaft to said member and enabling said member to be turned by rotation of the handle 18. On shifting the shaft 17 in the other direction, it is clutched to the carrier member 8 for the other cylinder, enabling the said carrier member to be operated. Similarly the sleeve 19 is provided with a disk 21 and pins 22 engaging in the holes in the collars 24 on the carrier members of the other two cylinders, enabling the same to be operated alternatively by longitudinal shifting and rotary movement of the hand wheel 20. The holes 23 in the respective disks 24 correspond in number and angular position with the spark plugs in the respective members.

It is necessary that the plug or carrier member 8 should fit gas-tight in its seat 28 in casing 6. To accomplish this, and at the same time avoid any possibility of the said member sticking or binding in its seat, for example, by expansion due to the heat, the periphery of said member is preferably made tapering or frusto conical, its seat being similarly formed, and a spring 29 being provided to engage between an outer face of casing 6 and the collar or disk 24 fast on a hub or extension 31 of carrier member 8 so as to continually draw said member into close engagement with its seat, but to enable it to be freely turned. Any binding which may take place may be readily destroyed by an endwise pull or blow on the manual operating device for said member, the operating movement of said device being in such direction as to tend to free the conical engaging parts aforesaid. Means are provided for locking the carrier member in its different positions, said means consisting, for example, of a spring pin 32 slidably mounted in a recess 33 in casing 6 and pressed by its spring 34 to cause the outer end of said pin to enter a perforation 23 in the aforesaid carrier 24. As the pins 22, above referred to, enter the said perforations, they eventually strike the locking pins 32 pressing the latter out of engagement with said perforations, and releasing the collar and attached carrier member for rotation by the manual operating device described.

The operating hand wheels 18, 20, are preferably weighted as at 18', 20', to tend to bring the clutching device to operative position.

The casing 6 has, at a part thereof convenient for inspection, an opening 35 at which the spark gap devices can be exposed for inspection and cleaning, said opening communicating or registering with one of the pockets 8' at the same time another of the pockets 8' is in communication or register with the opening 7 leading to the firing or combustion chamber. Three of these pockets are preferably provided, the third pocket being at the time referred to opposite a closed portion of the casing wall and therefore cut off from communication with the firing chamber or with the exposing opening.

36 designates a cover for the exposing and inspection opening.

Figure 1:
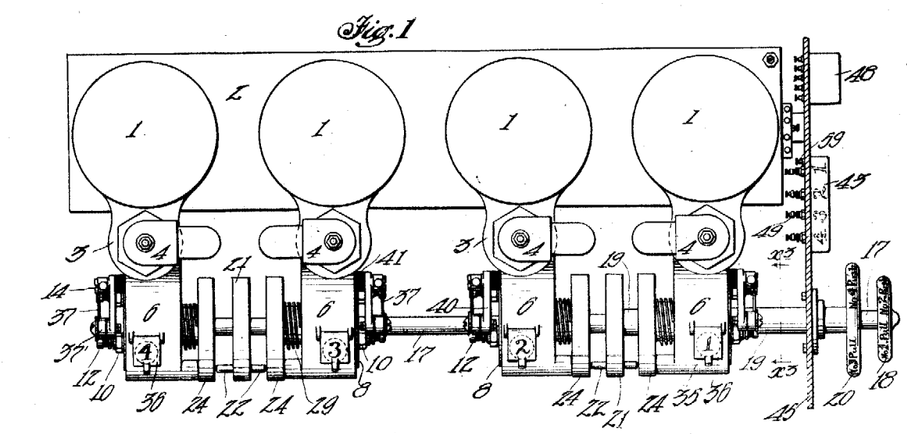
Figure 1 is a plan of the spark gap devices for a four cylinder engine.
Figure 2:
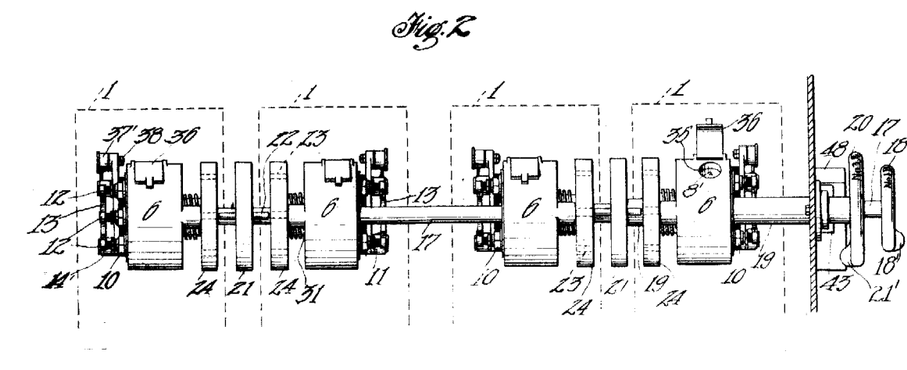
Fig. 2 is a side elevation thereof.
Figure 3:
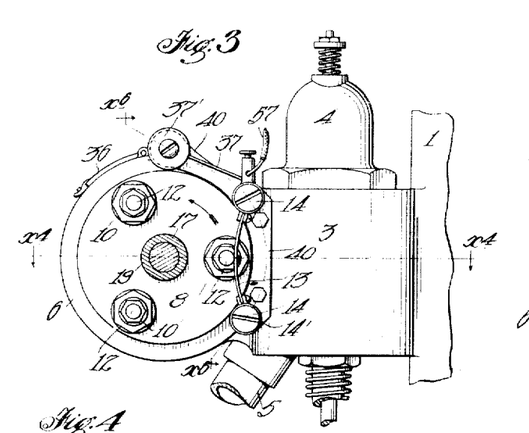
Fig. 3 is a section on line $x^3$—$x^3$ in Fig. 1.
Figures 4, 5, 6:
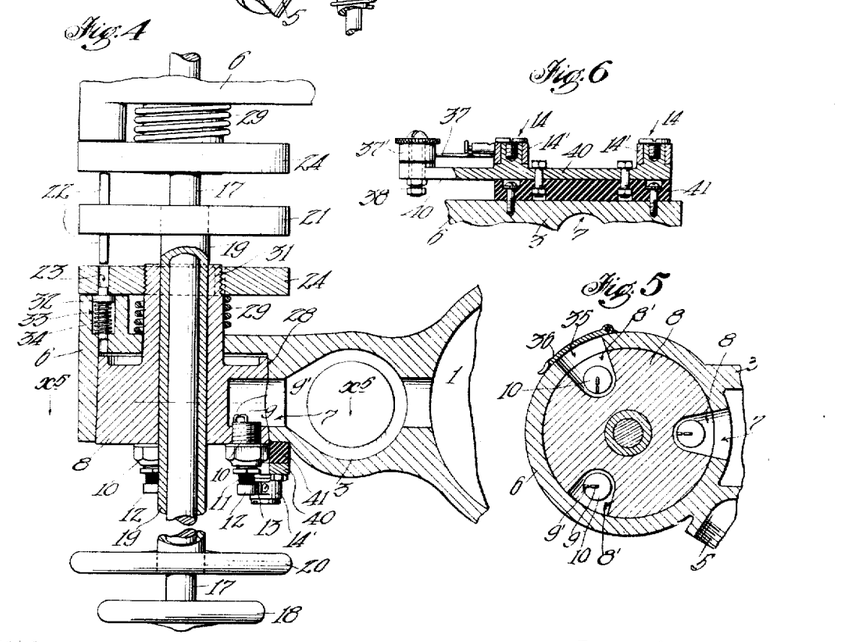
Fig. 4 is a section on the line $x^4$—$x^4$ in Fig. 3.
Fig. 5 is a section on the line in $x^5$—$x^5$ in Fig. 4.
Fig. 6 is a section on the line in $x^6$—$x^6$ in Fig. 3.
Figure 7:
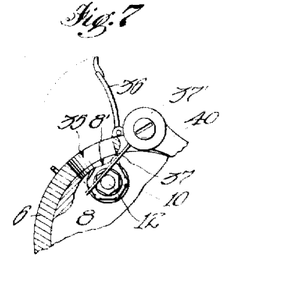
Fig. 7 is a fragmental view showing the sparking device in testing position.
Figure 8:
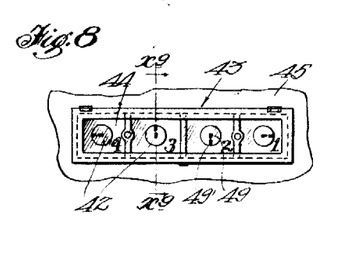
Fig. 8 is a front view of the detector device.
Figure 9:
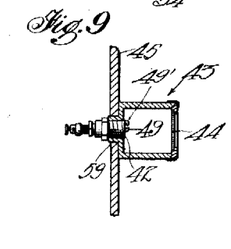
Fig. 9 is a transverse section of the detector device on the line $x^9$—$x^9$ in Fig. 8.
Figure 10:
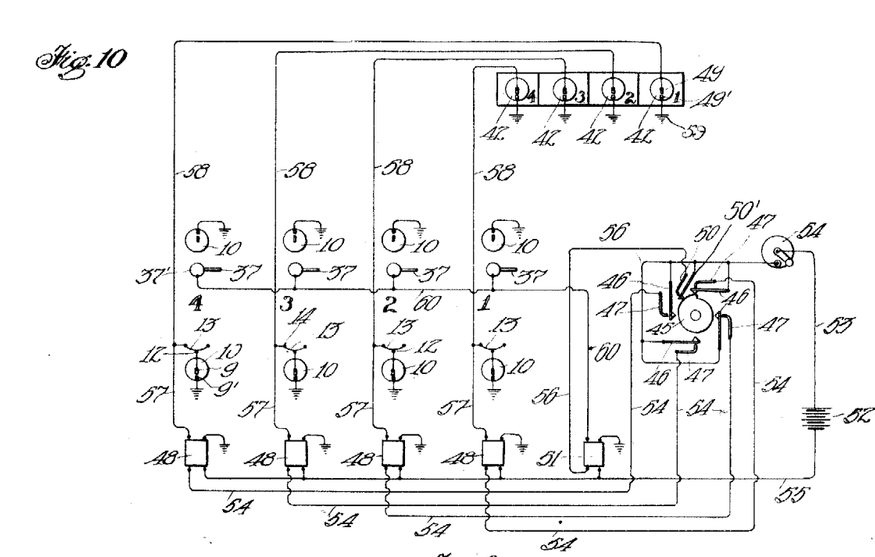
Fig. 10 is a diagram of the circuit connections.

To close the connection from the spark plug when in the testing or inspection position, a contact device 37 is provided, consisting of an arm attached to a pivoted sleeve 37' carrying a binding post 38 to which a circuit wire is attached in such manner as to permit said contact device to be turned over in contact with the head 12 at the outer end of the plug or to be turned back in position shown in Fig. 3. These parts are mounted on a support 40 secured on casing 6 by an insulating plate 41, the sleeve 37' being also insulated from said support.

In connection with the above described spark plug devices, means may be used for indicating at an external point the condition of the spark plug in the engine, such means being particularly desirable in case of multiple cylinder engines so that in case of stoppage of sparking, the cylinder giving the trouble can be located. This detector or warning means comprises spark gap devices located in shunt or parallel connection with the respective operating spark gap devices above described. The detector spark gap devices are preferably in the form of spark plugs 42, removably secured or screwed into a case 43, said case having a glass front 44 to enable the spark plugs to be in plain sight and being, in the case of an automobile engine, preferably located on the dash-board 45 directly in view of the operator. Said front is preferably hinged to the case so as to enable it to be thrown out of the way when close inspection or cleaning of the detector spark plugs is desired.

The various spark plug devices above described, can be connected in operating circuits in any usual manner, and the usual devices for controlling the circuit connections thereto may be employed.

45 designates the contact operating cam driven by the engine in the usual manner, and operating pairs of contacts 46, 47, controlling the connections to the respective spark coils 48 and also operating a pair of contact terminals 50, 50', controlling the connection of a special spark coil 51 for the testing operation above referred to.

The circuit connections are as follows: From the battery 52 a wire 53 leads through a switch 54 to the several contacts 46. From the other contacts 47 of each pair, wires 54 lead to the primary coils of the respective spark coils 48, the other ends of which are connected to return wire 55 leading back to the battery. The contact terminal 50 of the special set of contacts is connected by a wire 56 with the primary coil of special spark coil 51, whose other end is also connected to the return wire 55. Secondaries of the spark coils 48 are connected by wires 57 with the respective contact springs 13, by which communication is established to that one of the several spark plugs of each set which is in communication with the combustion chamber of the engine, the other terminals 9' of said spark plug being connected to ground, and the other terminal of the secondary of the corresponding spark coils being also grounded in the usual manner. A supplementary wire 58 leads from each secondary connection 57 to the insulated terminal 49 of the corresponding warning or detector spark gap plug 42, the other terminal 49' of said detector plug being grounded as at 59. From the special spark coil 51, a wire 60 leads to the several contact devices 37, by which connection is made to the respective spark gap devices 10 for testing out the latter when they are exposed at the inspection openings 35.

The electrodes 49, 49' of the detector spark plugs are located farther apart than the electrodes 9, 9' of the regular spark plugs, and it follows that when the latter are in good condition, the high tension current coming from the respective spark coils will pass through the regular spark plugs to the exclusion of the detector spark plugs. In case the condition of any one of the regular spark plugs becomes such that the current will fail to jump across same, for example, on account of deposition of oily matter thereon, or of bending of the electrodes, then the current is forced to take the path of higher resistance and will jump across the spark gap in the corresponding detector spark plug 42.

The operation is as follows: The engine is started up in the usual manner, the ignition being effected by successive operation of the spark devices, the cam means 45 serving to direct the current successively to said devices. It is a matter of common experience that in such operation the spark gap devices are liable to become disabled so that no spark is developed therein, and there is a resultant failure in ignition, which of course interferes seriously with the operation, and if it is a total failure, stops the operation of the engine. In case of a multiple cylinder engine, such as here shown, it is not likely that more than one spark gap device will become disabled at the same time. In case of failure of any one of the spark gap devices 10 in communication with the cylinders, the sparking current which passes through said spark gap device will be diverted to the corresponding detective spark gap device 42, producing thereat a spark which will indicate to the operator the fact that the spark has failed in the corresponding cylinder, and the spark gap devices 42 being numbered in accordance with the numbers of the cylinders, the operator knows at once which cylinder is at fault and can instantly remedy the trouble by replacing the spark gap device with one in good condition. For example, if the sparking device in the cylinder No. 1 has failed, then the detector spark device No. 1 will operate, and the attendant, noting this, will grasp the handle, pulling it toward him, thereby causing the pin 22 to enter one of the holes 23 in the collar 24, thereby coupling the collar 24 with the plug-carrying member 8 for the first cylinder. In this movement of the hand wheel and its attached parts, the said pin 22 eventually strikes the locking pin 32 and presses it out from the opening aforesaid, allowing the operator to turn the said device, for example, to the left, say one-third of a revolution, whereupon the locking pin 32 will snap into the next opening 23 and lock the carrying member 8 in that position. This operation, effected practically by a single movement of the attendant's hand and practically instantaneously, brings a new spark gap device or plug into communication with the combustion chamber so that the operation of the engine can proceed as before, and as there are three plugs in each carrier, there is still a reserve plug which can be similarly brought into play if this second spark gap fails. There is therefore no necessity for stopping the engine on account of any failure of spark devices. In the event of such failure, the defective spark plug can be substituted by another without necessity of missing more than one or two explosions. Moreover, this substituting operation brings the defective plug out of communication with the cylinder and into register with the inspection opening 35 so that by lifting the cover 36, the attendant can note the exact condition thereof, and in many cases can clean the same sufficiently without removing the plug from the carrier member. Meanwhile the operation of the engine is not interfered with in any way, as there is still a sparking plug in communication with the cylinder, and in fact, the defective plug 10 can, if desired, be removed from the engine entirely and carefully cleaned, or can be replaced by a new one, without interfering with the operation of the engine. If it be desired to test the exposed spark plug, the attendant turns the contact arm 37 to establish connection from the special spark coil 51 to the spark plug 10 then in communication with said arm and then the closure of the primary circuit of said spark coil by cam device 45 will cause high tension impulses to pass from the secondary of said coil through wire 60, arm 37, spark gap electrodes 9, 9', of said spark plug to ground, and thence to the other side of said spark coil. The circuit breaking devices are arranged to operate between the operation of two of the regular contact devices 46, 47, so that there is no interference with the operation of the latter. The operator can ascertain by the failure or occurrence of the spark in said spark plug, or by the character of the spark whether the said plug is in good condition.

In some cases it is desirable to remove the spark plug entirely from communication with the combustion chamber; for example, in coasting, it is advantageous to turn the said spark plug 8 to an intermediate position, bringing its several spark plugs all out of communication with the combustion chamber, the opening into the latter being then closed by said plug so that oil, dirt and dust moving in the cylinder during the coasting operation, do not reach any of the spark plugs.

If the operator neglects to bring the carrier to proper position, so that there is no spark device in operation thereto, the circuit device 13 is open circuited and the sparking current will pass through the corresponding detector plug 42, calling attention to the matter. Each detector plug can be tested by turning the carrier to break the circuit to the main plug, whereupon current will pass to the detector plug if it is in good condition.

It will be noted that the spark plug replacing means and the detector means operate coefficiently, the detector showing the existence and location of the trouble and the replacing means serving to correct the trouble, and when the replacing means is operated, it will restore the detector to normal condition, thus completing the cycle of operations and giving proof of proper condition.

What I claim is:—

1. An internal combustion engine provided with a plurality of igniting means, means for moving one of such igniting means out of its sparking position in the combustion chamber of the engine and for simultaneously moving another igniting means into said sparking position vacated by the removed igniting means, to maintain the sparking condition of the engine.

2. An internal combustion engine provided with a plurality of igniting means and means to move one of said igniting means out of communication with the combustion chamber of the engine and to simultaneously move another of said igniting means into such communication.

3. The combination with the cylinder of an internal combustion engine, of sparking means movable into and out of communication with the cylinder, a testing circuit closing means and circuit connections for connecting the sparking means in circuit when it is out of the cylinder, to test the same.

4. An internal combustion engine comprising a combustion chamber, a movable means carrying a plurality of spark plugs to bring the spark plugs by simultaneous movement alternatively into communication with the said chamber, and electric contact means for connecting the spark plug in circuit when in such communicating position.

5. In combination with an internal combustion engine having a combustion chamber, a plurality of sparking devices, controlling means operable to establish communication between one of said sparking devices and said chamber and simultaneously cut off another of said sparking devices from communication with said chamber, a sparking circuit, electric circuit connections operated by said controlling means for completing the sparking circuit through the sparking device in sparking relation to the combustion chamber, and an external sparking device connected in shunt with the sparking device in sparking relation to said combustion chamber whereby abnormally high resistance of the last named sparking device will be indicated by sparking at the external sparking device.

6. A combustion chamber, a movable carrier located adjacent thereto, and a plurality of igniting devices mounted on said carrier to be brought interchangeably into communication with said chamber.

7. A combustion chamber, a movable carrier located adjacent thereto, and a plurality of igniting devices removably mounted on said carrier to be brought interchangeably into communication with said chamber.

8. A combustion chamber, a movable carrier located adjacent thereto, a plurality of igniting devices mounted on said carrier to be brought interchangeably into communication with said chamber, and means for locking said carrier in its different operative positions.

9. A combustion chamber, a movable carrier located adjacent thereto, a plurality of igniting devices mounted on said carrier to be brought interchangeably into communication with said chamber, locking means for said carrier, and a manual operating device for the carrier engaging the locking means to unlock the carrier.

10. A combustion chamber, a casing adjacent thereto and communicating therewith, a member rotatably mounted in said casing and a plurality of igniting means carried by said member and movable therewith to be brought interchangeably into communication with said chamber.

11. A combustion chamber, a casing adjacent thereto and communicating therewith, a member rotatably mounted in said casing, a plurality of spark plugs carried by said member, and movable therewith to bring them alternatively into position to communicate with said chamber, and electric contact means connecting the spark plug in circuit when in such position.

12. A combustion chamber having an opening, a carrier movable adjacent to said opening, an electric igniting device carried by said carrier and provided with contact means, and fixed contact means located in the path of the contact means of the carrier.

13. In an internal combustion engine, a combustion chamber, a casing communicating therewith, a member rotatable in said casing, said member and its seat in the casing being tapered, a plurality of igniting means carried by said member, means for rotating the member to bring one of the igniting means out of and another into communication with the chamber, and a spring pressing said member upon its seat.

14. In an internal combustion engine, a support, a carrier rotatably mounted therein, an igniting device on said carrier provided with a contact and an electric contact spring mounted on said support to engage said contact.

15. In an internal combustion engine, a support, a carrier rotatably mounted therein, an igniting device on said carrier provided with a contact and an electric contact spring mounted on said support to engage said contact, said spring having pivotal supports between which it is sprung.

16. In an internal combustion engine, a combustion chamber, a casing communicating therewith and having an opening, a member movable in said casing and a spark gap device mounted in said member and movable therewith, into communication with the chamber or with the said opening, said spark gap device having a contact outside of the casing, and contact means movable to contact with the aforesaid contact when the spark gap device is exposed at the aforesaid opening.

17. A combustion chamber, a casing communicating therewith and having an opening, a member movable in said casing and a spark gap device mounted on said member and movable therewith into communication with the chamber or with the said opening, said spark gap device having a contact outside of the casing, contact means movable to contact with the aforesaid contact when the spark gap device is exposed at the aforesaid opening, and fixed contact means engaging the spark gap contact when the spark gap device is in communication with the aforesaid chamber.

18. In a multiple cylinder internal combustion engine, a plurality of igniting devices for the cylinders of the engine, means for controlling communication between the igniting devices and the respective cylinders, and a manual operating device movably mounted with respect to the engine and interchangeably connecting with the said controlling devices to control communication of any one of the igniting devices with the corresponding cylinder.

19. A multiple cylinder internal combustion engine, a carrier for each cylinder, a plurality of igniting devices on each carrier movable interchangeably thereby into communication with the cylinder, a manual operating device and clutch means connecting the same interchangeably with the respective carriers.

20. A multiple cylinder internal combustion engine, a carrier for each cylinder, a plurality of igniting devices on each carrier movable interchangeably thereby into communication with the cylinder, a manual operating device and clutch means connecting the same interchangeably with the respective carriers, and a lock for the carrier controlled by the movement of said clutch means.

21. An internal combustion engine comprising a combustion chamber, a movable means carrying a plurality of spark plugs and movable to bring the spark plugs by simultaneous movement alternatively into communication with the said chamber, and electric contact means for connecting the spark plug in circuit when moved to such communicating position, and to disconnect the spark plug from circuit when removed from such communicating position.

22. In an internal combustion engine, the combination of a working chamber having an ignition aperture, a movable carrier mounted on said chamber and a plurality of igniters secured to said carrier in such position that either one may be brought opposite the said aperture.

23. An internal combustion engine provided with a plurality of igniting means, means for moving one of such igniting means out of its sparking position, with relation to the combustion chamber, and into exposed position outside of the engine, and for simultaneously moving another igniting means into said sparking position vacated by the removed igniting means, to maintain the sparking condition of the engine.

24. An internal combustion engine provided with a plurality of igniting means and means to move one of said igniting means out of communication with the combustion chamber of the engine and into exposed position outside of the engine, and to simultaneously move another of said igniting means into such communication with the combustion chamber.

25. The combination with the cylinder of an internal combustion engine, of sparking means movable into and out of communication with the cylinder and movable into and out of exposed position outside of the engine, for observation and access, and circuit connections comprising a circuit closer for closing the circuit to the sparking means when it is in such exposed position to test the same.

26. An internal combustion engine comprising a combustion chamber, a movable means carrying a plurality of spark plugs to bring the spark plugs, by simultaneous movement, alternatively into communication with said chamber and into exposed position outside of the engine, for inspection and access, and electric contact means for connecting the spark plugs in circuit when in such communicating position.

27. In combination with a combustion chamber, a plurality of sparking devices and a casing therefor having an opening communicating with the combustion chamber and an opening communicating with the outer air, and means for bringing the said sparking devices alternatively into communication with the opening to the combustion chamber and with the exposure opening for inspection and access.

28. A combustion chamber, a movable carrier located adjacent thereto, a plurality of igniting devices mounted on said carrier to be brought interchangeably into communication with said chamber and into exposed position outside of said chamber, for inspection and access, and means for locking said carrier in its different operative positions.

29. A combustion chamber, a casing adjacent thereto and communicating therewith and having an outside exposure opening, a member rotatably mounted in said casing, and a plurality of igniting means carried by said member and movable therewith to be brought interchangeably into communication with said chamber, and into exposed position at said exposure opening.

30. In an internal combustion engine, a combustion chamber, a casing communicating therewith and having an opening communicating with said chamber and having also an external opening, a member movably mounted in said casing and igniting means carried thereby to be brought alternatively into communication with said openings.

31. A combustion chamber, a casing connected thereto and provided with an exposure opening and with an opening to said combustion chamber, and igniting means movably mounted in said casing to move into communication with the combustion chamber or with the exposure opening.

32. A combustion chamber, a movable carrier, inclosing means for the carrier having an exposure opening and an opening communicating with the combustion chamber, and a plurality of igniting devices on the carrier to be brought in the movement of the carrier alternatively into communication with the said openings.

33. A combustion chamber, a casing having an exposure opening and an opening communicating with the combustion chamber, a plurality of igniting devices, and a movable carrier for said igniting devices, to move the same alternatively into communication with the said openings.

34. The combination in an internal combustion engine, with a combustion chamber, of a plurality of internal spark gap devices and a carrier therefor bringing said devices alternatively into communication with said chamber, an external sparking device connected in shunt with the internal sparking device in communication with said combustion chamber, whereby abnormally high resistance of such internal sparking device will be indicated by sparking at the external sparking device.

35. The combination with a multicylinder internal combustion engine, of a plurality of internal spark gap devices for each combustion chamber of the engine, a carrier for moving said spark gap devices alternatively into communication with the combustion chamber, a circuit for supplying current to said spark gap devices when in communication with the combustion chamber, and an external spark gap device connected in shunt with each internal spark gap device in communication with a combustion chamber whereby abnormally high resistance of such internal sparking device will be indicated by sparking at the corresponding external sparking device.

36. In combination in an internal combustion engine having a combustion chamber, a plurality of sparking means a carrier supporting said sparking means whereby the sparking means are movable interchangeably into and out of internal igniting relation to said combustion chamber, an external sparking means connected in shunt with the internal sparking means in operative position with relation to said combustion chamber, whereby abnormally high resistance of such internal sparking means will be indicated by sparking at the external sparking means.

37. The combination with a multicylinder internal combustion engine, of a plurality of internal sparking means for each combustion chamber, a carrier for said sparking means whereby said sparking means are movable interchangeably into and out of internal igniting relation to such combustion chamber, an external sparking means connected in shunt with each of said internal sparking means in operative relation to said combustion chamber, said external sparking means being exposed for inspection, whereby abnormally high resistance of any of such internal sparking means will be indicated by sparking at the corresponding external sparking means.

38. In an internal combustion engine, the combination of a working chamber and a movable carrier on said chamber supporting a plurality of igniters, for the ready substitution of a fresh igniter for a defective one.

39. In an internal combustion engine, the combination of a working chamber, a carrier mounted to turn adjacent to said working chamber and a plurality of igniters secured to said carrier at equal distances from its axis.

40. In combination with a cylinder of an internal combustion engine, a movable carrier located adjacent thereto, and a plurality of ignition devices mounted on said carrier, to be brought interchangeably into communication with the interior of said cylinder.

41. In combination with an internal combustion engine, a combustion chamber provided with a firing tube, a rotatably mounted carrier and a plurality of ignition plugs mounted on said carrier to be brought interchangeably into communication with said tube by revolving said carrier.

42. In combination with an internal combustion engine, an ignition chamber, a movably mounted carrier provided with holes for two or more spark plugs and means for locking said carrier in position.

43. In combination with an internal combustion engine, an ignition chamber and a rotatable carrier provided with holes for two or more spark plugs.

44. In combination with an internal combustion engine, a firing tube communicating with a spark plug, a removable mounting member for said spark plug provided with a number of holes to receive other spark plugs and means for locking said spark plug mounting member in different positions and thereby utilizing different spark plugs in said engine cylinder.

45. In combination with an internal combustion engine, an ignition chamber, a cylinder, a firing tube connecting said ignition chamber and said cylinder, a movably mounted carrier provided with holes for two or more spark plugs, two or more spark plugs mounted on said carrier, an aperture provided in said cylinder walls and located so as to successively communicate with each of said spark plugs as said movable carrier is rotated, a pivot about which said movable carrier is rotatable, means for locking said carrier in position and means for passing an electric current through said spark plugs.

46. In combination with a combustion chamber, a firing tube communicating with a spark plug, a plurality of spark plugs, and a movably mounted member for said plugs to be moved to different positions, thereby utilizing different plugs.

47. The combination with the combustion chamber of an engine, of a plurality of sparking devices, controlling means for bringing said sparking devices alternatively into communication with the combustion chamber, and electrical circuit connections controlled by said controlling means to put the said circuit connections in connection with the sparking device which is in communication with the combustion chamber.

48. The combination with the combustion chamber of an engine, of a plurality of sparking devices, controlling means for bringing said sparking devices alternatively into communication with the combustion chamber, a sparking circuit, and electric circuit connections operated by said controlling means for completing the sparking circuit through the sparking device in communication with the combustion chamber.

49. The combination, with the combustion chamber of an engine, of a plurality of sparking devices, controlling means for establishing one of said sparking devices in igniting relation to the combustion chamber and simultaneously breaking the igniting relation of another sparking device to said combustion chamber, and simultaneously cutting off communication between the combustion chamber and the sparking plug whose igniting relation has been so broken, a sparking circuit, and circuit connections operated by said controlling means for completing the sparking circuit through the sparking device in sparking relation with the combustion chamber.

In testimony whereof, I have hereunto set my hand at Los Angeles California this 9th day of August 1905.

LOUIS K. LEAHY

In presence of—
ARTHUR P. KNIGHT,
FREDERICK S. LYON.